United States Patent [19]

Tomita

[11] Patent Number: 5,056,030

[45] Date of Patent: Oct. 8, 1991

[54] APPARATUS FOR CARRYING OUT DECOUPLING CONTROL OF A T-DIE

[75] Inventor: Yoshiyuki Tomita, Tokyo, Japan

[73] Assignee: Sumitomo Heavy Industries, Ltd., Tokyo, Japan

[21] Appl. No.: 401,171

[22] Filed: Aug. 31, 1989

[30] Foreign Application Priority Data

Aug. 31, 1988 [JP] Japan .................. 63-214794

[51] Int. Cl.$^5$ .......................................... G06F 15/46
[52] U.S. Cl. .................... 364/473; 264/40.7; 425/141; 425/162
[58] Field of Search ............... 364/473, 476, 469, 554; 425/135, 141, 140, 162, 169; 264/40.1–40.7

[56] References Cited

U.S. PATENT DOCUMENTS 3,612,839 10/1971 DeWitt et al. .................. 364/568 X
4,861,409 8/1989 Hashida et al. .................. 364/476 X Primary Examiner—Joseph Ruggiero
Attorney, Agent, or Firm—Burns, Doane, Swecker & Mathis

[57] ABSTRACT

In an apparatus for use in carrying out decoupling control of a T-die which has a pair of lip portions with a gap extended between the lip portions and with the lip portions divided into a plurality of zones individually driven by driving devices, respectively, a processing circuit individually controls the driving devices by the use of a predetermined decoupling control algorithm. The predetermined decoupling algorithm is given by a plurality of desired displacement vectors of the gap for the respective zones and a decoupling control matrix defined by inverse numbers of products of a command value/driving pressure converting matrix (Kp) and a driving pressure/displacement converting matrix (Kα). Alternatively, the decoupling control matrix is repeatedly modified with time to decrease a difference between the desired gap displacement (Δy) and the measured gap displacement (Δy$_m$). Each command voltage value vector Δu of the command value/driving pressure converting matrix is compensated by the use of a figurative inherent error of the lip structure.

4 Claims, 5 Drawing Sheets

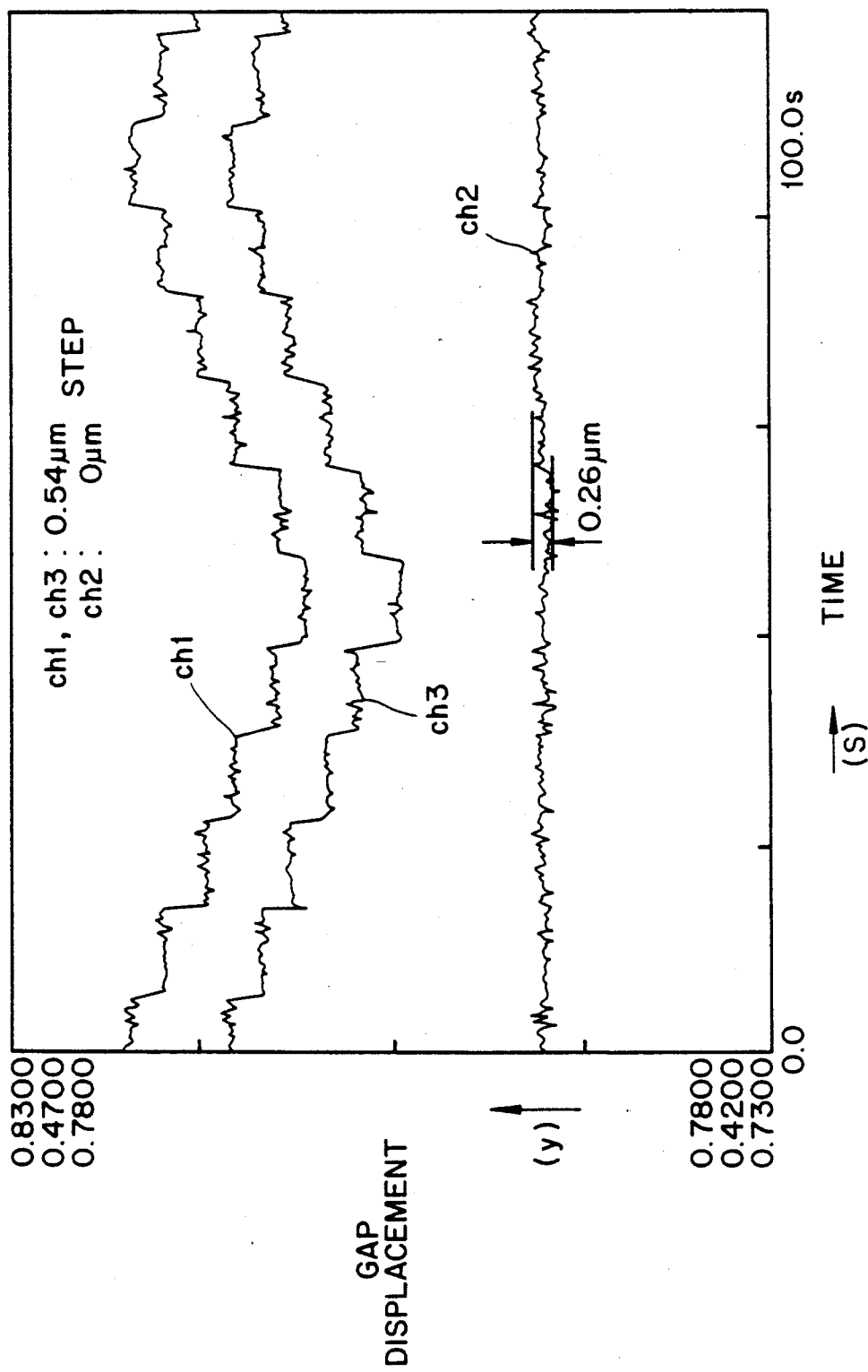

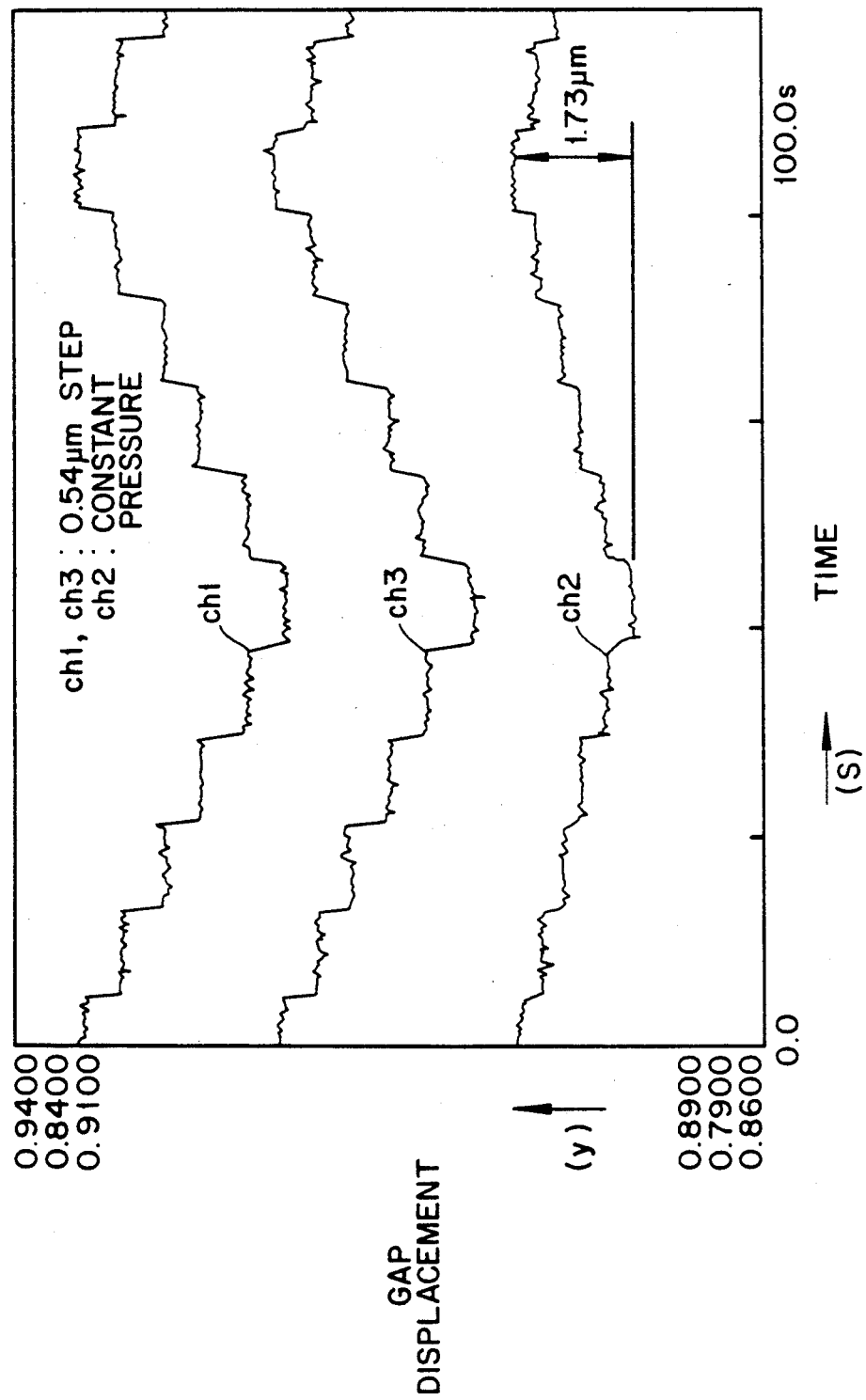

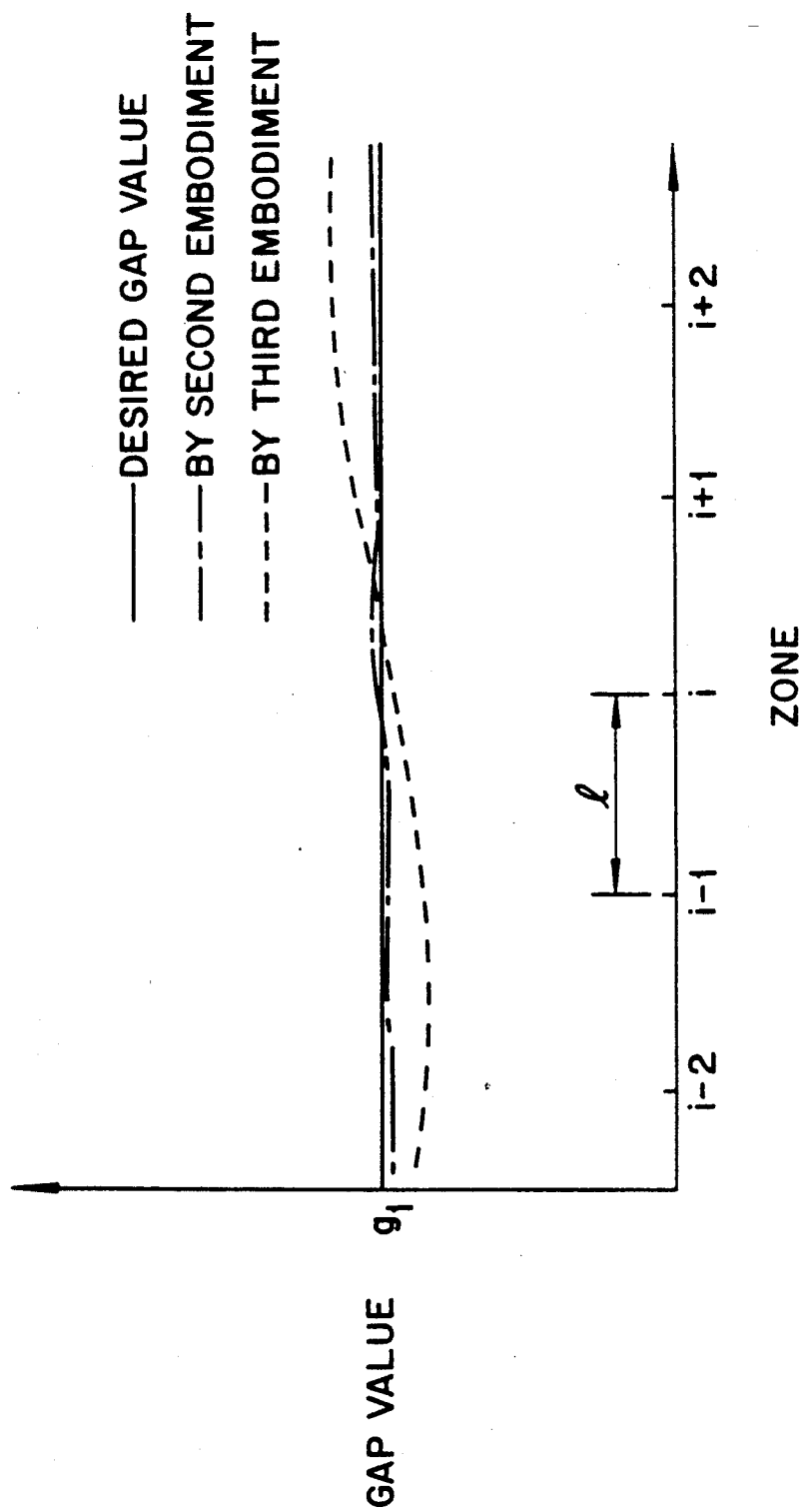

APPARATUS FOR CARRYING OUT DECOUPLING CONTROL OF A T-DIE

BACKGROUND OF THE INVENTION

This invention relates to an apparatus for controlling a T-die which extrudes a molten resin flow in the form of a sheet. More particularly, this invention relates to an apparatus which is the type of controlling a thickness of a molten resin flow.

Apparatus of the type above described have been already known and disclosed in Japanese Patent Prepublications (Kôkai) Nos. 78,726 of 1983 and 184,832 of 1987.

In the manner which will later be described in connection with this invention, such an apparatus is for use in combination with the T-die.

In general, the T-die is used for extruding a sheet of a molten resin which has a width and a thickness. For this purpose, the T-die comprises a lip member having a pair of lip portions with a gap extended between the lip portions along a widthwise direction. The lip member is divisible into first through N-th zones along the widthwise direction. The sheet is extruded through the gap, in the form of the sheet. The T-die further comprises first through N-th driving devices which are mechanically coupled to the zones to individually drive the respective zones of the lip member with N-dimensional driving force vectors, respectively, and to partially and individually control the gap.

Such individual control of the zones of the lip structure brings about individual interference which might occur at adjacent zones of the lip member and which may be called mutual interaction. Due to such mutual interaction, the sheet extruded from the T-die often has a locally variable thickness, which degrades a quality of the sheet. Moreover, it is difficult to avoid influences of such mutual interaction.

Therefore, attempts have been tried to decrease the influences of the mutual interaction in such an apparatus. The apparatus comprises a comparing circuit which compares a plurality of partial thicknesses of the sheet measured at the respective zones with a predetermined desired thicknesses to produce thickness differences. A desired gap calculating circuit calculates N-dimensional desired displacement vectors ($\Delta y$) of the gap at every one of the zones from the thickness differences.

In addition, a command value processing circuit processes signals so as to individually control each of the driving devices by the use of proportional constants between the desired displacement vectors and each of the driving force vectors of the driving devices to decrease the influences of the mutual interaction.

With the above apparatus in the Japanese Patent Prepublication No. 78,726 of 1983, however, the influences of the mutual interaction could not be favorably decreased by the above-mentioned processing method. This is because the proportional constants inevitably include many uncertainties and result in.

Even with the processing way in the Japanese Patent Prepublication No. 184,832 of 1987 such that each of driving forces of the driving devices is repeatedly calculated to under the control output signals within a predetermined allowable range, it is necessary to solve linear equations defined by the proportional constants. This makes a calculation infavorably long and degrades reliability of the T-die.

SUMMARY OF THE INVENTION

It is therefore an object of the present invention to provide an apparatus which is capable of carrying out decoupling or non-interacting control of a T-die to avoid the influences of the mutual interaction.

It is another object of this invention to provide an apparatus of the type described, which is capable of making a calculation time short, to enable a quick response of the T-die.

Other objects of this invention will become clear as the description proceeds.

In accordance with this invention, there is provided an apparatus for use in combination with a T-die which comprises a lip member having a pair of lip portions with a gap extended between the lip portions along a predetermined direction, the lip member being divisible into first through N-th zones along the predetermined direction and defined by a stiffness matrix, the T-die extruding a flow material through the gap in the form of a sheet and further comprising first through N-th driving means coupled to the first through N-th zones for individually driving the first through the N-th zones of the lip member, respectively, to partially and individually control the gap, the apparatus further comprising comparing means for comparing a plurality of measured thicknesses of the flow material at the first through the N-th zones with desired thicknesses predetermined for the first through N-th zones, respectively, to produce first through N-th thickness differences, desired gap calculating means coupled to the comparing means for calculating N-dimensional desired displacement vectors of the gap corresponding to each of the zones from the thickness differences, controlling means for individually controlling the driving means on the basis of the desired displacement vectors, respectively, wherein the controlling means comprises decoupling control matrix memorizing means for memorizing an $N \times N$ inverse matrix on the basis of the stiffness matrix as an $N \times N$ decoupling control matrix for the first through N-th zones, respectively, command value processing means coupled to the driving means and the decoupling control matrix memorizing means for processing N-dimensional command value vectors in response to the desired displacement vectors and the decoupling control matrix by the use of a decoupling control algorithm predetermined in connection with the decoupling control matrix and the desired displacement vectors to partially and individually control the gap and to extrude the flow material with a substantial uniform film thickness.

BRIEF DESCRIPTION OF THE DRAWING

FIG. 3(A) is a graph showing a case of decoupling control by the use of the compensated control output voltage vectors as third embodiment.

FIG. 3(B) is a graph showing a case of the prior art without decoupling control;

FIG. 4 is a graph which shows curves representing differences of gap values by second embodiment and third embodiment from the desired gap value.

DESCRIPTION OF THE PREFERRED EMBODIMENTS

First Embodiment

An apparatus according to an embodiment of this invention is for use in carrying out decoupling control of a T-die in a manner to be described later in detail.

Figure 1:
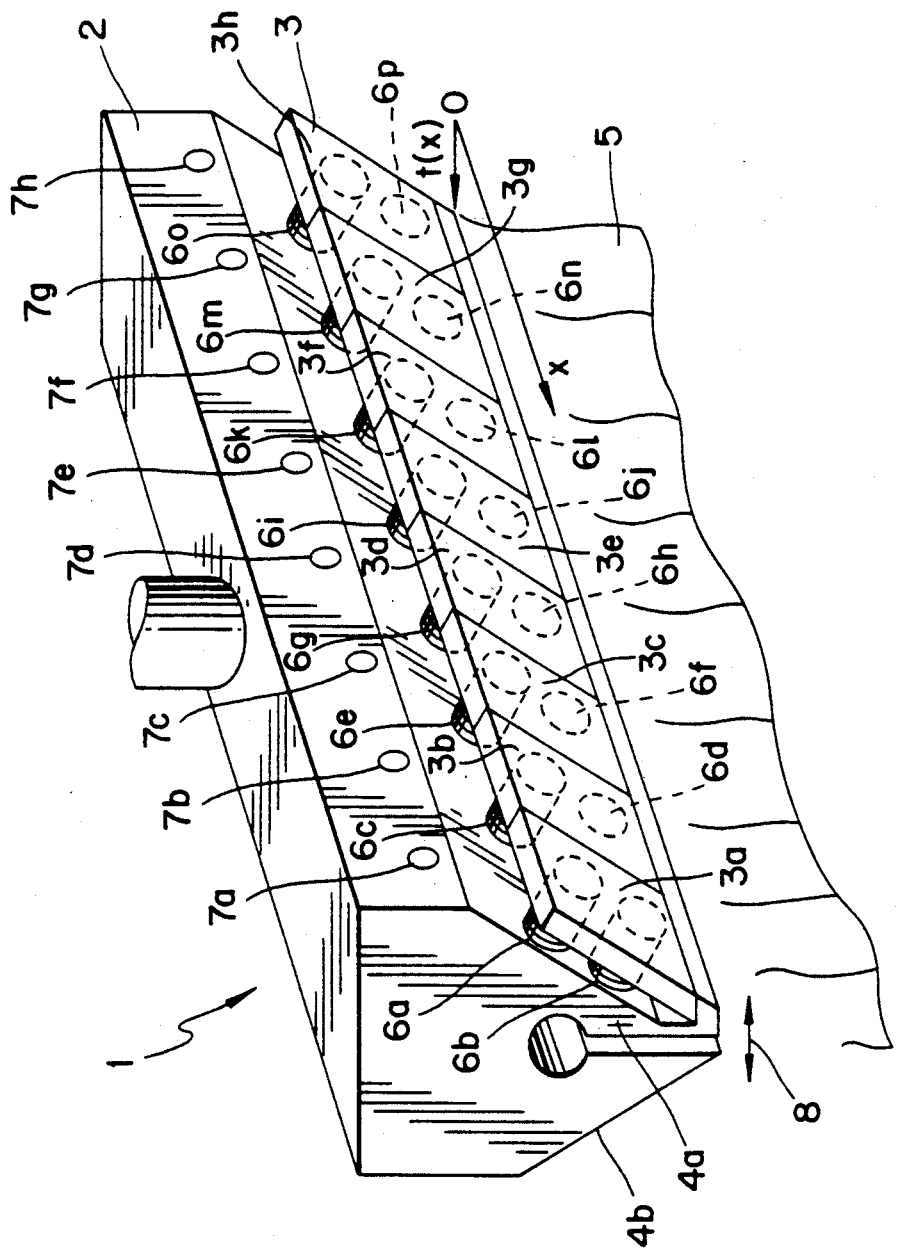
FIG. 1 is a schematic perspective view of a T-die according to an embodiment of the instant invention.

Referring to FIG. 1, the T-die 1 essentially comprises a lip structure 2, a moving device 3, and an electro-pneumatic converter (not shown). The lip structure 2 comprises front-side and rear-side members including front and rear lip portions 4a and 4b, respectively, with a gap 8 extended between the lip portions 4a and 4b along a widewise (X-axis) direction of the lip portions 4a and 4b. The lip structure 2 is divisible into first through eighth zones in the example being illustrated. A molten resin is extruded from the gap 8 in the form of a sheet 5. A plurality of air supply bore holes 7a–7h are arranged along the widewise direction of the lip structure 2 and drilled in a direction perpendicular to the X-axis direction.

The moving device 3 comprises a plurality of bellows 6a–6p disposed over the front-side member. The bellows 6a–6p are communicated with the air supply bore holes 7a–7h within the front-side member, respectively. More specifically, the bellows 6a–6b are communicated in pair with the air supply bore hole 7a, while the bellows 6c–6d are communicated in pair with the air supply bore hole 7b. Likewise, the bellows 6e–6f; 6g–6h; 6k–6l; 6m–6n, and 6o–6p are communicated in pairs with the air supply bore holes 7c through 7h.

The electro-pneumatic converter comprises first through eighth solenoid operated valves (not shown) and individually supplies compressed air as driving pressures (P) through the respective solenoid operated valves to the bellows 6a through 6p through the bore holes 7a–7h. The solenoid operated valves are individually operated by first through eighth control output voltages from the apparatus described later.

The driving device 3 has first through eighth divided boards 3a–3h corresponding to the first through eighth zones, respectively. The divided board 3a–3h are connected to end portions of the bellows 6a–6p, respectively. More particularly, the divided board 3a is connected to the end portions of the bellows 6a and 6c, while the divided board 3b is connected to the end portions of the bellows 6c and 6d. Similarly, each of the divided board 3a through 3h is connected to end portions of a pair of the bellows such as 6e, 6f; 6g, 6h; 6i, 6j; 6k, 6l; 6m, 6n; 6o, 6p. Each of lower ends of the divided boards 3a–3h rests on an edge of the front lip portion 4a. As shown in FIG. 1, the bellows 6a through 6p are disposed between the front-side wall of the lip structure 2 and the divided boards 3a through 3h.

Therefore, when individual supply of the driving pressures (P) to the bellows 6a through 6p is increased and decreased, the bellows 6a–6p are individually expanded or contracted. The expansion or contraction of the bellows 6a through 6p act as driving torques (T) to the divided boards 3a through 3h, respectively.

Specifically, the gap 8 between the lip portions 4a and 4b could be partially and individually changed at every one of the first through eighth zones by controlling the first through eighth driving pressures (P) supplied to the bellows 6a through 6p of the moving device 3.

The first through eighth driving pressures (P) are controlled by the first through eighth solenoid operated valves of the electro-pneumatic converter, respectively. The first through eighth solenoid operated valves are controlled by first through eighth command voltages (U) from the apparatus.

Figure 2:
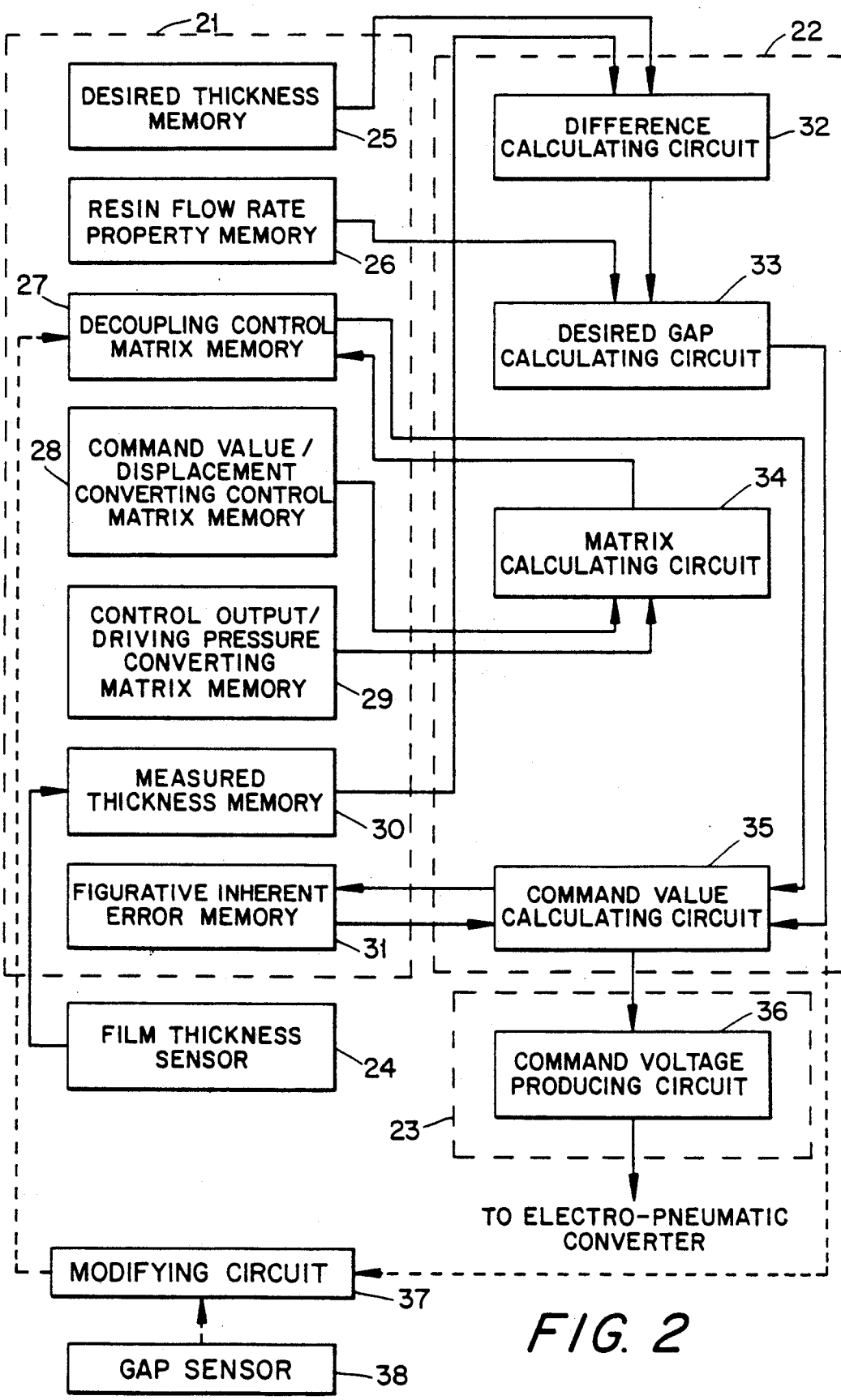
FIG. 2 is a schematic block diagram of the apparatus according to the embodiment of the instant invention.

Referring to FIG. 2, the apparatus is combined with a command voltage producing section 23 which is associated with the bellows 6a to 6p (FIG. 1) through the solenoid operated valves of the electro-pneumatic converter. The apparatus essentially includes a memorizing section 21, a processing section 22, and a film thickness sensor member 24.

In the illustrated example, the memorizing section 21 comprises a desired thickness memory 25, a resin flow rate property memory 26, a decoupling control matrix memory 27, a driving pressure/displacement converting matrix ($K\alpha$) memory 28, a command value/driving pressure converting matrix (kp) memory 29, and a measured thickness memory 30.

On the other hand, the processing section 22 comprises a difference calculation circuit 32, a desired gap calculating circuit 33, a matrix calculating circuit 34, and a command value calculating circuit 35. The difference calculation circuit 32, the desired gap calculating circuit 33, and the command value calculating circuit 35 may be referred to as a comparing unit, a gap distance calculating unit, and a control output processing unit, respectively, as will become clear as the description proceeds.

The command producing section 23 is coupled to the command value calculating circuit 35 and comprises a command voltage producing circuit 36 communicated with the electro-pneumatic converter.

An operation of the apparatus will be described hereinunder.

First of all, the film thickness sensor 24 measures a plurality of partial thicknesses of the sheet 5 (FIG. 1) at the first through eighth zones to supply measured partial thicknesses to the measured thickness memory 30, respectively.

The desired thickness memory 25 memorizes predetermined desired thicknesses which correspond to the respective zones and may be variable with time in a manner to be described later.

The measured thicknesses are successively read out of the measured thickness memory 30 at every one of the zones in synchronism with the predetermined desired thicknesses of the desired thickness memory 25. Both the measured thicknesses and the predetermined desired thicknesses are sent to the difference calculation circuit, namely, comparing unit 32.

The comparing unit 32 compares the measured thicknesses with the predetermined desired thicknesses to supply first through eighth thickness differences to the desired gap calculating circuit 33, respectively.

In this event, the resin flow rate property memory 26 produces properties representative of a flow rate of resin dependent on viscosity of the resin. The viscosity of the resin is determined by a volume and a pressure of the resin. Each property is sent to the deesired gap calculating circuit 33.

The desired gap calculating circuit 33 calculates first through eighth desired displacement vectors of the gap at the respective zones on the basis of the thickness differences and the property.

The command value calculating circuit 35 is supplied with an inverse matrix on the basis of the stiffness matrix (G) produced from the decoupling control matrix memory 27. The command value calculating circuit 35 is also supplied as desired inputs with the desired displacement vectors and calculates first through eighth command voltage values by the use of the decoupling control algorithm predetermined in connection with the decoupling control matrix and the desired displacement vectors. The first through eighth command voltage values are delivered to the command voltage producing circuit 36.

The command voltage producing circuit 36 produces first through eighth command voltages corresponding to the first through eighth command voltage values and supplies to the first through eighth solenoid operated valves of the electro-pneumatic converter.

The decoupling control matrix is memorized in the decoupling control matrix memory 27 and is preliminarily calculated by the matrix calculating circuit 34.

The matrix calculating circuit 34 calculates, on the basis of the double matrices (Kα, Kp), first through eighth decoupling control matrices. The double matrices (Kα, Kp) are memorized in the driving pressure/displacement converting matrix (Kα) memory 28 and the control input/driving pressure converting matrix (kp) memory 29, respectively.

The description will now proceed to a case of calculating the double matrix (Kα, Kp).

Now, consider a driving torque vector ΔT of the bellows 6a to 6p given to the divided boards 3a–3h. The driving torque vector ΔT is represented by a transposed matrix of a column vector and is given by:

$$\Delta T = (\Delta T_1, \Delta T_2, \ldots, \Delta T_i, \ldots, \Delta T_n)^T$$

where each of the elements, such as $\Delta T_1$, $\Delta T_2$, ..., $\Delta T_N$, is made to correspond to each of the zones in the transposed matrix.

A desired displacement vector Δy is defined by total displacements of the gap at the respective zones and is similarly given by the use of a transposed matrix of a column vector by:

$$\Delta y = (\Delta y_1, \Delta y_2, \ldots, \Delta y_i, \ldots, \Delta y_n)^T$$

Hence, the total displacements of the gap is defined by:

$$\Delta y = G^{-1} \Delta T \quad (1)$$

where $G^{-1}$ is the inverse matrix of the stiffness matrix (G) of a whole of the lip structure 2. The stiffness matrix (G) is represented by a square matrix as follows.

$$G = \begin{bmatrix} g_{11} & g_{21} & & & & \\ g_{21} & g_{22} & g_{23} & & & \\ & \ddots & \ddots & \ddots & & \\ & g_{i-1,i-2} & g_{i-1,i-1} & g_{i-1,i} & & \\ & g_{i,i-1} & g_{i,i} & g_{i,i+1} & & \\ & & g_{i+1,i} & g_{i+1,i+1} & g_{i+1,i+2} & \\ & & \ddots & \ddots & \ddots & \\ & & g_{n-1,n-2} & g_{n-1,n-1} & g_{n-1,n} \\ & & & g_{n,n-1} & g_{n,n} \end{bmatrix}$$

On the other hand, a driving pressure vector ΔP given to the bellows 6a–6p from the electro-pneumatic converter as a compressed air is represented by a transposed matrix of a column vector and given by:

$$\Delta P = (\Delta P_1, \Delta P_2, \ldots, \Delta P_i, \ldots, \Delta P_n)^T$$

Since the driving pressure vector ΔP has a proportional relation with the driving torque vector ΔT, this relation is defined by the following equation:

$$\Delta T = K_{PT} \Delta P \quad (2)$$

where, $$K_{PT} = \text{diag}(K_{PT1}, K_{PT2}, \ldots, K_{PTi}, \ldots, K_{PTn})$$

Herein, let consideration be directed to a driving pressure/displacement converting matrix which converts the driving pressure vector ΔP into the desired displacement vector Δy and which is represented by Kα. From Equations (1) and (2), the desired displacement vector Δy is rewritten into:

$$\Delta y = K\alpha \cdot \Delta P, (K\alpha = G^{-1} K_{PT}) \quad (3)$$

Subsequently, command voltage value vector (Δu) sent to the electro-pneumatic converter is represented by the use of a transposed matrix of a column vector by:

$$\Delta u = (\Delta u_1, \Delta u_2, \ldots, \Delta u_i, \ldots, \Delta u_n)^T$$

where each of the elements as the transposed matrix, such as $\Delta u_1$, $\Delta u_2$, ..., $\Delta u_N$, is made to correspond to each of the zones in the above-transposed matrix.

In addition, a command value/driving pressure converting matrix Kp is defined to convert the command voltage value vector Δu into the driving pressure vector ΔP. Under the circumstances, it is possible to calculate Δy, ΔP, and Kp from Equation (3) in accordance with the following equations.

$$\Delta y = K\alpha \cdot \Delta P$$

$$\Delta P = Kp \cdot \Delta u$$

$$Kp = \text{diag}(K_{P1}, K_{P2}, \ldots, K_{Pi}, \ldots, K_{Pn})$$

Under the circumstances, it is possible to calculate the command voltage value vector Δu in an initial state by modifying the above-mentioned equations. Specifically, the command voltage value vector Δu is given by:

$$\Delta y = K\alpha \cdot Kp \cdot \Delta u$$

$$\therefore \Delta u = (K\alpha \cdot Kp)^{-1} \cdot \Delta y \quad (4)$$

Therefore, the decoupling calculation may be easily executed by the use of Equation 4.

Now, a product of Kα·Kp can be calculated by modifying Equation (4) in the following manner.

$$\begin{bmatrix} \frac{\partial y_1}{\partial u_1} & \frac{\partial y_1}{\partial u_2} & \cdots & \frac{\partial y_1}{\partial u_i} & \cdots & \frac{\partial y_1}{\partial u_n} \\ \frac{\partial y_2}{\partial u_1} & \frac{\partial y_2}{\partial u_2} & \cdots & \frac{\partial y_2}{\partial u_i} & \cdots & \frac{\partial y_2}{\partial u_n} \end{bmatrix} \quad (5)$$

-continued $$Ka \cdot Kp = \begin{vmatrix} \vdots & \vdots & \vdots & \vdots \\ \frac{\partial y_i}{\partial u_1} & \frac{\partial y_i}{\partial u_2} & \cdots \frac{\partial y_i}{\partial u_i} \cdots & \frac{\partial y_i}{\partial u_n} \\ \vdots & \vdots & \vdots & \vdots \\ \frac{\partial y_n}{\partial u_1} & \frac{\partial y_n}{\partial u_2} & \cdots \frac{\partial y_n}{\partial u_i} \cdots & \frac{\partial y_n}{\partial u_n} \end{vmatrix}$$

With reference to Equation (5), the product of $K\alpha$ and $Kp$ can be also calculated from each of displacement properties of the zones, which are measured when each command voltage value vector $\Delta u$ is individually given to bellows $6a$ through $6p$.

Alternatively, the produce matrix $(K\alpha \cdot Kp)$ can be calculated from the stiffness matrix $(G)$ obtained by the use of the FEM (Finite Element Method) analysis and designated value.

SECOND EMBODIMENT

This description will now be made as regards a case where the method is defined by decoupling the displacement of the gap on the use of some equilibrium in connection with the desired displacement vector $\Delta y$ and a measured displacement vector $\Delta y_m$.

It may be understood in this event that the product matrix $(K\alpha \cdot Kp)$ is repeatedly modifying so as to decrease a displacement vector difference between the desired displacement vector $\Delta y$ and the current measured displacement vector $\Delta y_m$.

Using $(K\alpha' \cdot Kp')$ as a model, the current measured displacement vector $\Delta y_m$ can be balanced with the desired displacement vector $\Delta y$ and is given by:

$$\Delta y_m = (K\alpha \cdot Kp) \cdot (K\alpha' \cdot Kp')^{-1} \cdot \Delta y \quad (6)$$

If, now, $(K\alpha \cdot Kp)$ is replaced by an interacting matrix $(K_1')$, the interacting matrix $(K_1')$ can be calculated from each of displacement properties of the zones when each command voltage value vector $\Delta u$ on the basis of Equation (6) is individually given to the bellows $6a$ through $6p$. Then:

$$K_1' = \begin{bmatrix} \frac{\partial y_1}{\partial y_{r1}} & \frac{\partial y_1}{\partial y_{r2}} & \cdots & \frac{\partial y_1}{\partial y_{rm}} \\ & \cdot & & \\ & \cdot & & \\ & \cdot & & \\ \frac{\partial y_n}{\partial y_{r1}} & \frac{\partial y_n}{\partial y_{r2}} & \cdots & \frac{\partial y_n}{\partial y_{rm}} \end{bmatrix} \quad (7)$$

Hence, the interacting matrix $(K_1')$ into Equation (4) gives:

$$\Delta u = (K\alpha' \cdot Kp')^{-1} \cdot K_1'^{-1} \cdot \Delta y \quad (8)$$

Therefore, $(K\alpha' \cdot Kp')^{-1} \cdot K_1'^{-1}$ can be defined as a modified inverse matrix, which is useful in efficiently producing superior command voltage value vector $(u)$, even if displacement properties vary through an aged deterioration.

Further referring to FIG. 2, a modifying circuit 37 cooperates with a gap sensor 38, the decoupling control matrix memory 27, and the desired gap calculating circuit 33 in the second embodiment, as depicted at broken lines. For this purpose, the modifying circuit 37 responds to a partial current displacement of the gap as the measured displacement vector $\Delta y_m$ measured by the gap sensor 38 and the desired displacement vector $\Delta y$ calculated by the desired gap calculating circuit 33. Specifically, the modifying circuit 37 repeatedly calculates modified inverse matrix $(K\alpha' \cdot Kp')^{-1} \cdot K_1'$ on the basis of the desired displacement vector $\Delta y$ and the current measured displacement vector $\Delta y_m$ referring to Equations (7) and (8), above mentioned, and supplies the modified inverse matrix $(K\alpha' \cdot Kp')^{-1} \cdot K_1'$ to the decoupling control matrix memory 27. The decoupling control matrix memory 27 replaces the stored inverse matrix $(K\alpha \cdot Kp)^{-1}$ by the modified inverse matrix $(K\alpha' \cdot Kp')^{-1} \cdot K_1'$.

THIRD EMBODIMENT

The description will now proceed to a case where the method is suitable for compensating the command voltage value vector $\Delta u$ for an error command voltage value vector $\Delta u_e$ in connection with a figurative inherent error of the lip structure 2.

Consider an allowable gap value error and a current gap value error of the figurative inherent error of the lip structure 2. The current gap value error of the figurative inherent error is caused by a heterogeneity of thermal expansion or a working error of the built-up lip structure 2.

Hence, an inherent difference between the current gap value error and the allowable gap value error is representative of an inherent gap value error vector $\Delta e$ as follows:

$$\Delta e = (\Delta e_1, \Delta e_2, \ldots, \Delta e_j, \ldots, \Delta e_n)$$

Using inherent gap value error vector $\Delta e$ for the error command value voltage vector $\Delta u_e$ yields:

$$\Delta u_e = (K\alpha \cdot Kp)^{-1} \cdot \Delta e \quad (9)$$

or, solving for $(K\alpha' \cdot Kp')^{-1} \cdot K_1'^{-1}$ from equation (8) yields:

$$\Delta u_e = (K\alpha' \cdot Kp')^{-1} \cdot K_1'^{-1} \cdot \Delta e \quad (10)$$

If an additional value of the desired displacement vector $\Delta y$ and the inherent gap value error vector $\Delta e$ is compensated desired displacement vector $\Delta y + \Delta e$), a compensated control output voltage vector $(\Delta u + \Delta u_e)$ from Equation (9) or (10) result which is:

$$\Delta u + \Delta u_e = (K\alpha \cdot Kp)^{-1} \cdot (\Delta y + \Delta e)$$

or $$\Delta u + \Delta u_e = (K\alpha' \cdot Kp')^{-1} \cdot K_1'^{-1} \cdot (\Delta y + \Delta e) \quad (11)$$

It is possible to modify a gap error as illustrated in FIG. 4 in the above-mentioned manner.

FIRST EXPERIMENT

Three curves shown in FIGS. 3(A) and 3(B) show results of plotting the time-measured gap displacement dependece of three points $ch_1$, $ch_2$, and $ch_3$ next to each other of the zones in the lip structure, which means that both of $ch_1$ and $ch_3$ are gradually driven at a step of 0.54 $\mu m$. With respect to the point $P_1$, the decoupling control is carried out in FIG. 3(1) on one hand and a constant pressure is given in FIG. 3(2) on the other hand.

FIG. 3(A) is a graph showing a case of decoupling control by the use of the compensated command voltage value vector ($\Delta u$) from Equation (8). As a result, it will be understood that $ch_2$ is just only driven at about 0.26 μm.

FIG. 3(B) is a graph showing a case of the prior art without decoupling control, $ch_2$ of the prior art is driven at about 1.73 μm under the influence of the mutual interaction.

SECOND EXPERIMENT

Referring to FIG. 4, wherein a solid line represents a variation of desired gap values, a dot-and-dash line and a broken line show results of experiments made by the use of the methods according to the second and the third embodiments, respectively. As illustrated in FIG. 4, only slight differences take place between the desired gap values and the measured gap values.

What is claimed is:

1. In an apparatus for use in combination with a T-die which comprises a lip member having a pair of lip portions with a gap extended between said lip portions along a predetermined direction, said lip member being divisible into first through N-th zones along said predetermined direction and defined by a stiffness matrix, said T-die extruding a flow material through said gap in the form of a sheet and further comprising first through N-th driving means coupled to said first through N-th zones for individually driving said first through said N-th zones of the lip member, respectively, to partially and individually control said gap, said apparatus comprising:

comparing means for comparing a plurality of measured thicknesses of said flow material at said first through said N-th zones with desired thicknesses predetermined for the first through N-th zones, respectively, to produce first through N-th thickness differences;

desired gap calculating means coupled to said comparing means for calculating N-dimensional desired displacement vectors of said gap corresponding to each of said zones from said thickness differences;

controlling means for individually controlling said driving means on the basis of said desired displacement vectors, respectively;

the improvement wherein said controlling means comprises:

decoupling control matrix memorizing means for memorizing $N \times N$ inverse matrix on the basis of said stiffness matrix as $N \times N$ decoupling control matrix for said first through N-th zones, respectively;

command value processing means coupled to said driving means and said decoupling control matrix memorizing means for processing N-dimensional command value vectors in response to said desired displacement vectors and said decoupling control matrix by the use of a decoupling control algorithm predetermined in connection with said decoupling control matrix and said desired displacement vectors to partially and individually control said gap and to extrude said flow material with a substantial uniform film thickness.

2. An apparatus as claimed in claim 1, wherein:

said first through N-th driving means comprises first through N-th supplying means and first through N-th moving means, said supplying means coupled to said command value processing means and responsive to said N-dimensional command value vectors for supply N-dimensional driving force vectors to said moving means, said moving means mechanically coupled to said first through N-th zones and responsive to said N-dimensional driving force vectors for individually moving the lip member to partially and individually control said gap;

said decoupling control matrix being defined by inverse numbers of products of $N \times N$ driving force/displacement converting matrix for the respective zones and $N \times N$ command value/driving force converting matrix for the respective zones;

said $N \times N$ driving force/displacement converting matrix being for converting said N-dimensional driving force vectors into said desired displacement vectors, respectively;

said command value/driving force converting matrix being for converting said N-dimensional command value vectors into said driving force vectors, respectively.

3. An apparatus as claimed in claim 1, measured displacements of said gap corresponding to each of said zones controlled in the basis of said desired displacement vectors, said measured displacements of said gap being measured as N-dimensional measured displacement vectors, respectively, wherein said apparatus further comprises modifying means coupled to said decoupling control matrix memorizing means and desired gap calculating means for repeatedly modifying said $N \times N$ decoupling matrix into $N \times N$ modified decoupling matrix so as to reduce displacement vector differences between said desired displacement vectors and said measured displacement vectors, respectively.

4. An apparatus as claimed in claim 1, said lip member being inherently defined by N-dimensional predetermined allowable value errors and N-dimensional measured gap value errors, wherein said apparatus further comprises figurative inherent error calculating means coupled to said command value processing means for calculating N-dimensional compensated command value vectors to compensate said N-dimensional command value vectors for said N-dimensional predetermined allowable value errors and said N-dimensional measured gap value errors, respectively.

* * * * *